Jan. 19, 1937.　　　D. G. CRANDALL　　　2,068,535
MEANS FOR LOCATING CEMENT
Filed June 11, 1935　　2 Sheets-Sheet 1
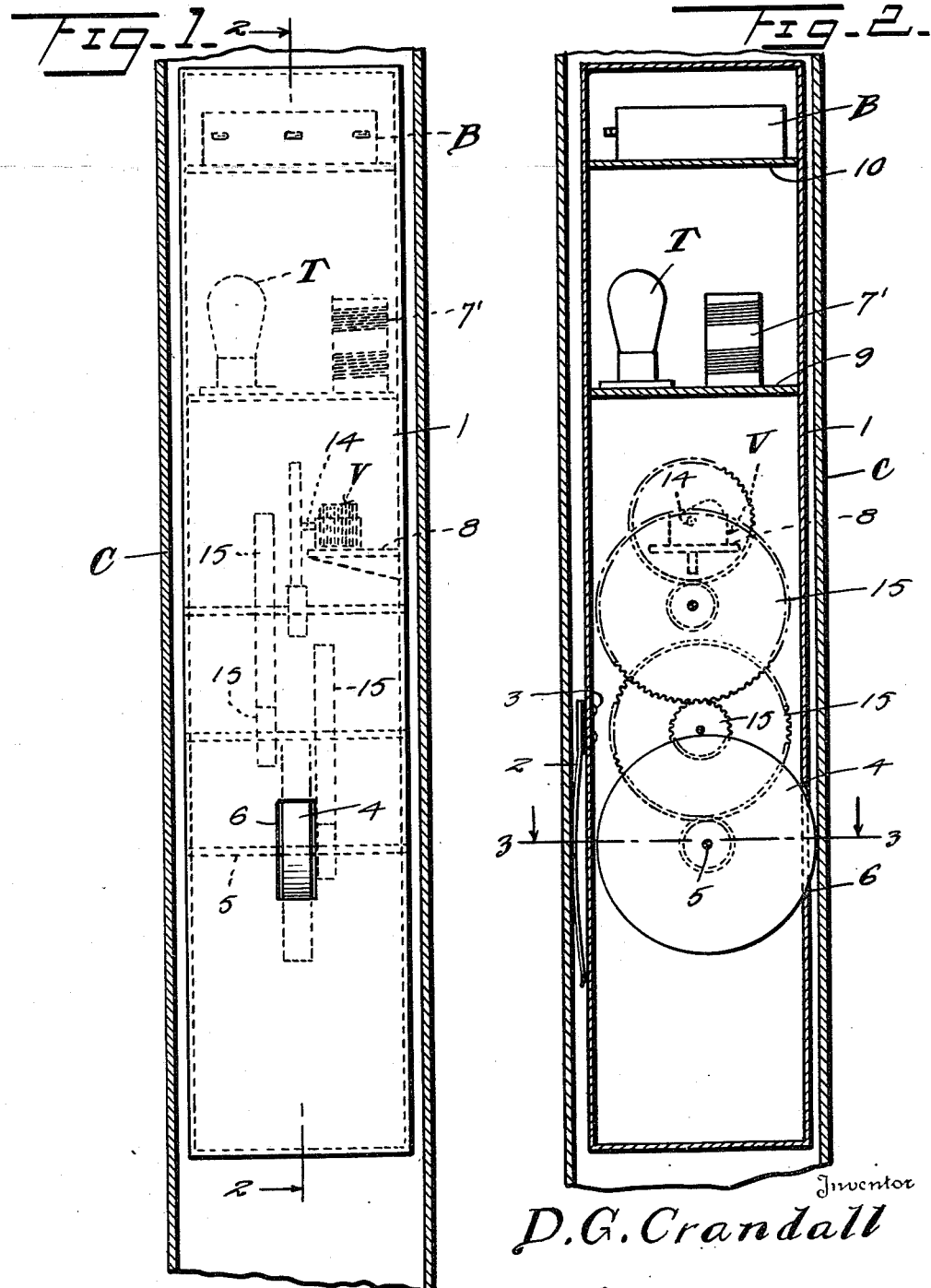
Inventor
D. G. Crandall
By Watson E. Coleman
Attorney Jan. 19, 1937.  D. G. CRANDALL  2,068,535
MEANS FOR LOCATING CEMENT
Filed June 11, 1935  2 Sheets-Sheet 2
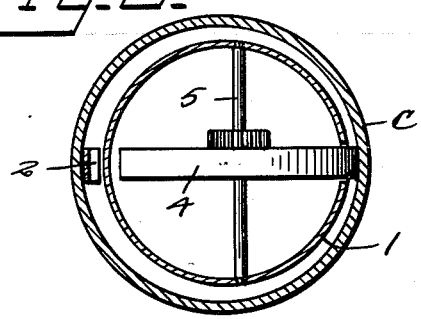
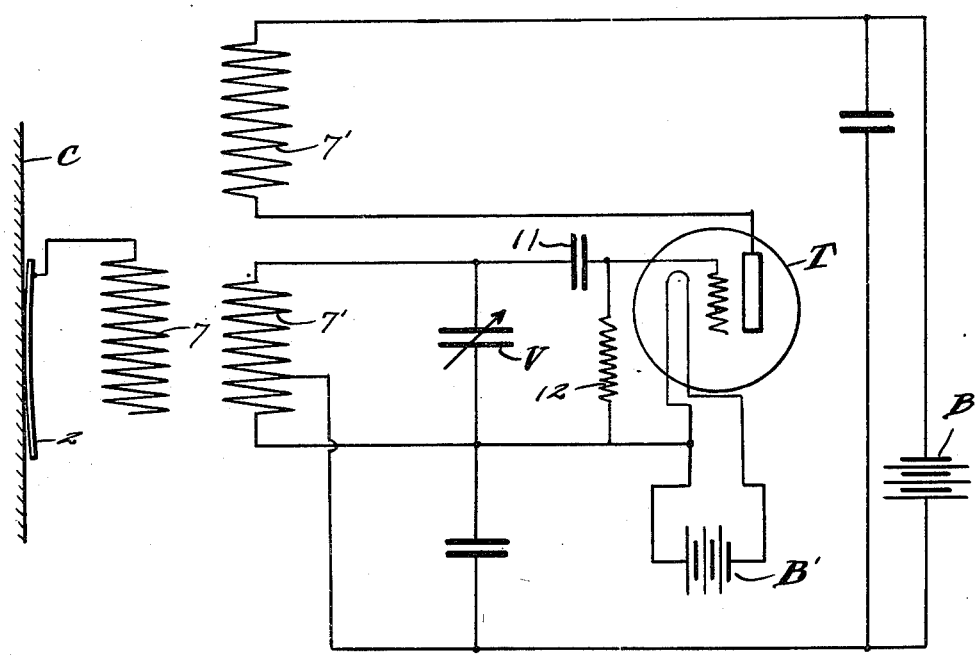
Inventor
D. G. Crandall
By Watson E. Coleman
Attorney Patented Jan. 19, 1937

2,068,535

UNITED STATES PATENT OFFICE 2,068,535

MEANS FOR LOCATING CEMENT

Delmar G. Crandall, Bakersfield, Calif.

Application June 11, 1935, Serial No. 26,090

4 Claims. (Cl. 177—311)

This invention relates to a method and means for locating cement when being pumped down the casing of a deep well, and it is primarily an object of the invention to provide a method and means of this kind whereby variable signals are transmitted to the surface to denote the various depths within the casing the cement reaches.

Another object of the invention is to provide a method and means of this kind including an instrument which travels down the casing with the cement and which is at all times in electrical contact with the casing, said instrument including means whereby an electric current is carried from the instrument to the surface through the casing as a conductor and wherein the instrument when in transit down the casing operates to vary the frequencies of the current so that the variable frequencies transmitted to the surface allow for ready computation to determine the depth of the cement as it is pumped down the well.

The invention consists in the details of construction and in the combination and arrangement of the several parts of my improved method and means for locating cement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating an instrument constructed in accordance with an embodiment of my invention in applied position within a well casing, certain of the parts being indicated by broken lines;

Figure 2 is a sectional view taken substantially on the line 2—2 of Figure 1;

Figure 3 is a sectional view taken substantially on the line 3—3 of Figure 2;

Figure 4 is a diagrammatic view showing the electrical hook-up as herein embodied.

As disclosed in the accompanying drawings, C denotes a casing of the general type employed in connection with deep wells. In pumping cement down a well it is important to know the depth of such cement as it is pumped down. In accordance with the present invention after the cement is put within the well my improved instrument is placed upon the top of such cement and is pumped down with the cement. This instrument as herein disclosed comprises a cylindrical shell or member 1 of desired dimensions which may freely travel down the casing C.

Carried exteriorly of this member 1 is a leaf spring 2 secured at one end, as at 3, to the casing, said spring being of a bow type and having constant contact with the wall of the casing C and possessing sufficient tension to firmly press against the wall of said casing C the projected portion of a roller or wheel 4 rotatably mounted, as at 5, within the member 1. This roller or wheel 4 extends through a suitably positioned opening 6 provided in the wall of the member 1. The spring 2 also constitutes an electrical contact and, as is particularly illustrated in Figure 4, this spring or contact 2 is in electrical connection with the output end of an induction coil 7 and which includes a variable condenser D. This condenser is supported within the member 1 upon a suitably positioned shelf 8 while the tube T and the various coils 7 and 7' are mounted upon a platform 9 intersecting the interior of the member 1 and at a desired distance below a second platform 10 intersecting such member upon which is positioned the various batteries B and B'.

This oscillating circuit in its detail is not traced as it is believed to be readily understood from Figure 4 with the further understanding that if desired it is possible to use a different hook-up. It is desired, however, that the hook-up include the condenser 11 and the resistor 12 to give the correct grid bias voltage. It is also to be stated that the battery B will be of different voltage for different tubes T to produce the required signal strength and that the battery B' produces the correct filament voltage.

The variable condenser V is used to change the frequency of the signal. As the variable condenser is turned out of mesh it reduces its capacity and changes the frequency of the signal. The roller plates of this variable condenser are carried by a shaft 14 and this shaft is operatively connected through a gear train to the shaft 5. The ratio of the various gears 15 comprised in the gear train is preferably such that for every one hundred feet the instrument travels in the casing C with the roller or wheel 4 in rotation, the signal will be changed five frequencies; that is to say, five oscillations or cycles per second. For example, if the instrument with the cement is pumped down two thousand feet the frequency of the signal would change one hundred frequencies on the basis of a change of five frequencies for each one hundred feet.

The signals are carried to the surface through the casing C which serves as a conductor and the frequency readings are obtained by any preferred receiver for this purpose. As this receiver records the frequency of the signal the location of the cement can be readily determined.

From the foregoing description it is thought to be obvious that a means for locating cement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An instrument for transmitting variable frequency signals to the surface of a deep well through the casing of the well comprising a member to be pumped down the casing and including a variable oscillating circuit, means for making electrical contact between the oscillating circuit and the casing to permit the casing to carry the signals, said circuit also including a variable condenser for varying the frequencies of the signal in accordance with the depth to which the instrument travels, and means for operating the variable condenser as the instrument moves down the casing for changing the frequencies of the current so that the signals passing to the surface through the casing indicate the approximate depth the instrument has travelled down the well.

2. An instrument for transmitting variable frequency signals to the surface of a deep well through the casing of the well comprising a member to be pumped down the casing and including a variable oscillating circuit, means for making electrical contact between the oscillating circuit and the casing to permit the casing to carry the signals, said circuit also including a variable condenser for varying the frequencies of the signal, means for operating the variable condenser as the instrument moves down the casing for changing the frequencies of the current, said means comprising a wheel having rolling contact with the casing, and a gear train operatively connecting the wheel with the shaft of the variable condenser to change the capacity of such variable condenser and to effect a change in frequencies of the signal transmitted to the casing to allow the determination at the surface the approximate depth the instrument has travelled down the well.

3. An instrument for transmitting variable frequency signals to the surface of a deep well through the casing of the well comprising a member to be pumped down the casing and including a variable oscillating circuit having electrical contact with the casing to permit the casing to carry the signals, said circuit also including a variable condenser for varying the frequencies of the signal, means for operating the variable condenser as the instrument moves down the casing for changing the frequencies of the current, said means comprising a wheel having rolling contact with the casing, and a gear train operatively connecting the wheel with the shaft of the variable condenser to change the capacity of such variable condenser and to effect a change in frequencies of the signal transmitted to the casing, the contact between the instrument and the casing constituting a spring, said spring also operating to maintain the wheel in contact with the casing, said spring being substantially diametrically opposed to the point of contact of the wheel with the casing, the contact of the spring with the casing allowing the variable frequency signals to be carried through the casing to the surface to determine the depth of travel of the instrument down the well.

4. An instrument for transmitting variable frequency signals to the surface of a deep well through the casing of the well to determine the depth of travel of the instrument down the well, comprising a member to be pumped down the casing and carrying a variable oscillating circuit including a leaf spring contact secured to the periphery of the member and having frictional engagement with the casing as the instrument travels theredown, a variable condenser within the member for varying the frequencies of the signal, and means within the member including a wheel for operating the variable condenser as the instrument moves down the casing for changing the frequencies of the current, said wheel extending beyond the periphery of the member for rolling contact with the casing, the spring contact also maintaining the wheel in sufficient frictional engagement with the casing to assure rotation of the wheel as the instrument travels down the well.

DELMAR G. CRANDALL.